US012205434B2

(12) United States Patent
Higgins et al.

(10) Patent No.: US 12,205,434 B2
(45) Date of Patent: Jan. 21, 2025

(54) CARDLESS LOGIN AT TABLE GAMES

(71) Applicant: IGT, Las Vegas, NV (US)

(72) Inventors: Kevin Higgins, Reno, NV (US); Erik Petersen, Reno, NV (US); Christopher Levin, Reno, NV (US); Eduardo Meza, Henderson, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/601,116

(22) Filed: Mar. 11, 2024

(65) Prior Publication Data

US 2024/0212426 A1 Jun. 27, 2024

Related U.S. Application Data

(63) Continuation of application No. 17/675,162, filed on Feb. 18, 2022, now Pat. No. 11,954,965, which is a continuation of application No. 16/921,767, filed on Jul. 6, 2020, now Pat. No. 11,257,319, which is a continuation of application No. 15/992,424, filed on May 30, 2018, now abandoned.

(51) Int. Cl.

| | |
|---|---|
| ***G07F 17/32*** | (2006.01) |
| ***A63F 3/00*** | (2006.01) |

(52) U.S. Cl.
CPC ........ *G07F 17/322* (2013.01); *A63F 3/00157* (2013.01); *G07F 17/3293* (2013.01)

(58) Field of Classification Search
CPC . G07F 17/322; G07F 17/3293; A63F 3/00157
See application file for complete search history.

(56) References Cited

U.S. PATENT DOCUMENTS

| | | | |
|---|---|---|---|
| 10,573,129 | B2 | 2/2020 | Higgins et al. |
| 11,257,319 | B2 | 2/2022 | Higgins et al. |
| 11,954,965 | B2 | 4/2024 | Higgins et al. |
| 2008/0113772 | A1 | 5/2008 | Burrill et al. |
| 2009/0143141 | A1 | 6/2009 | Wells et al. |
| 2014/0323210 | A1 | 10/2014 | Patceg et al. |
| 2016/0240043 | A1 | 8/2016 | Graf et al. |
| 2017/0092059 | A1 | 3/2017 | Nelson |
| 2017/0221306 | A1 | 8/2017 | Patceg et al. |
| 2019/0192975 | A1 | 6/2019 | Higgins et al. |

(Continued)

OTHER PUBLICATIONS

Official Action for Australian Patent Application No. 2019201754, dated Jan. 19, 2024 4 pages.

(Continued)

*Primary Examiner* — David L Lewis
*Assistant Examiner* — Shauna-Kay Hall
(74) *Attorney, Agent, or Firm* — Sheridan Ross P.C.

(57) ABSTRACT

Technology for managing a player session at a gaming table is disclosed. A table management system receives identifying information of a player seated at the gaming table transmitted by a mobile device associated with the player. The identifying information includes a seating position of the player at the gaming table, the seating position determined by the mobile device through interaction with a locating device placed at the seating position at the gaming table. The table management system generates the player session for the player for playing a wagering game at the gaming table using the identifying information of the player transmitted by the mobile device.

20 Claims, 9 Drawing Sheets

(56) References Cited

U.S. PATENT DOCUMENTS

| | | | |
|---|---|---|---|
| 2019/0371110 | A1 | 12/2019 | Higgins et al. |
| 2020/0020194 | A1 | 1/2020 | Higgins et al. |
| 2020/0027302 | A1 | 1/2020 | Petersen et al. |

OTHER PUBLICATIONS

Official Action for U.S. Appl. No. 15/992,424, dated Sep. 9, 2019 11 pages.
Official Action for U.S. Appl. No. 15/992,424, dated Mar. 6, 2020 21 pages.
Notice of Allowance for U.S. Appl. No. 16/921,767, dated Oct. 19, 2021 8 pages.
Notice of Allowance for U.S. Appl. No. 17,675,162, dated Dec. 12, 2023 10 pages.

CARDLESS LOGIN AT TABLE GAMES

CROSS REFERENCE TO RELATED APPLICATION

The present application is a continuation of and claims priority to U.S. application Ser. No. 17/675,162, filed on Feb. 18, 2022, which is a continuation of and claims the benefit of priority to U.S. patent application Ser. No. 16/921,767, filed on Jul. 6, 2020, now U.S. Pat. No. 11,257,319, issued Feb. 22, 2022, which is a continuation of and claims the benefit of priority to U.S. patent application Ser. No. 15/992,424, filed on May 30, 2018, now abandoned, the entire disclosures of which are hereby incorporated by reference.

BACKGROUND

The present disclosure relates in general to gaming devices and systems, and more particularly, to communications between mobile devices and the gaming devices and systems.

Casinos and other forms of gaming comprise a growing multi-billion dollar industry both domestically and abroad, with table games continuing to be an immensely popular form of gaming and a substantial source of revenue for gaming operators. Such table games are well-known and can include, for example, poker, blackjack, baccarat, craps, roulette and other traditional standbys, as well as other more recently introduced games such as pai-gow, Caribbean Stud, Spanish 21, and Let It Ride, among others. Under a typical gaming event at a gaming table, a player places a wager on a game, whereupon a winning may be paid to the player depending on the outcome of the game. As is generally known, a wager may involve the use of cash or one or more chips, markers or the like, as well as various forms of gestures or oral claims. The game itself may involve the use of, for example, one or more cards, dice, wheels, balls, tokens or the like, with the rules of the game and any payouts or pay tables being established prior to game play. As is also known, possible winnings may be paid in cash, credit, one or more chips, markers, or prizes, or by other forms of payouts.

BRIEF SUMMARY

Various embodiments for managing a player session at a gaming table are disclosed. A table management system receives identifying information of a player seated at the gaming table transmitted by a mobile device associated with the player. The identifying information includes a seating position of the player at the gaming table, the seating position determined by the mobile device through interaction with a locating device placed at the seating position at the gaming table. The table management system generates the player session for the player for playing a wagering game at the gaming table using the identifying information of the player transmitted by the mobile device.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying drawings.

DETAILED DESCRIPTION

Figure 1:
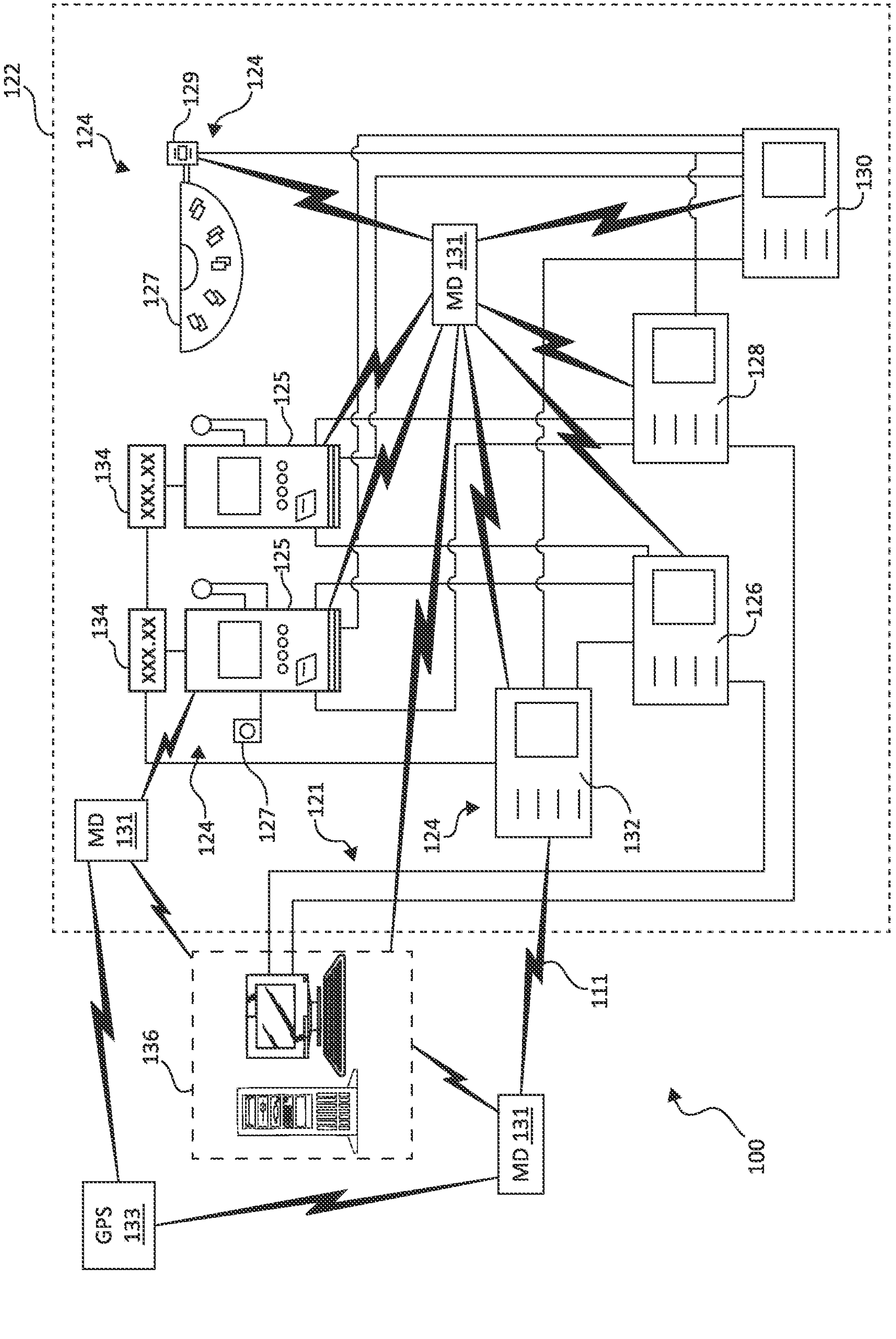
FIG. 1 is a block diagram illustrating a gaming system environment with a gaming terminal data repository (GTDR) connected via one or more network interface(s) to a gaming network which, for example, may include gaming devices (e.g., gaming terminals)

As aforementioned, casinos and other forms of gaming establishments comprise a growing multi-billion dollar industry both domestically and abroad, with table games and electronic gaming machines (EGMs) continuing to be an immensely popular form of gaming and a substantial source of revenue for gaming operators. Users or players of these various games have a general interest in using their mobile devices (e.g., cell phones, electronic tablets, computers, and the like) in these casinos and other gaming establishments for placing wagers and receiving one or more winnings (such as a gaming award, gaming bonus, progressive award, and/or jackpots). There are benefits to allowing players to use their mobile devices (smartphones, tablets, etc.), in conjunction with virtual gaming accounts (managed through gaming establishment issued cards) to transfer money to and from EGMs and gaming kiosks (such as convenience, security, and accounting benefits), and much of the industry is increasingly reliant on mobile/virtual technology to receive wager funding from players and fund the one or more winnings associated with gameplay.

To wit, some gaming establishments have developed (or currently are developing) card-less and cashless ecosystems which allow patrons to fund games and pay for goods and services using various gaming establishment application(s) on their mobile device. These applications are often linked to a cashless or virtual account managed by the gaming establishment which may in turn be linked to one or more financial institution accounts (e.g., bank, credit union, or other external funding accounts). Using this technology, a player may “card-in” (i.e., login, or more specifically, establish a player session) to an EGM or other gaming kiosk using their mobile device by establishing a connection from their respective mobile device to the EGM or gaming kiosk over a Bluetooth®, Near Field Communication (NFC), or Wi-Fi protocol, or by other means such as interacting with a Quick Response (QR) code associated with the particular player station. Once a player session is established between the mobile device and the EGM or gaming kiosk, players are, again, able to fund wagers and receive potential winnings associated with the game they are playing using the virtual account managed by the gaming establishment, where the virtual account may be ultimately funded by an external account at a bank or other financial institution outside the gaming establishment.

Generally, in EGM implementations for example, this system works by providing an antenna and a logic device within the cabinet of the EGM that controls and reads the data from the antenna. A typical physical connection between the logic device that controls the antenna and the antenna is a USB connection. In the case of a Bluetooth®-based solution, when the player's mobile device is placed near the antenna mounted in the cabinet, the mobile device initiates a wireless connection to wirelessly connect to the logic device inside the machine using a protocol that is communicated via the antenna, to the logic device that controls the antenna. The antenna may be controlled by a Slot Machine Interface Board (SMIB) inside the EGM, by the EGM directly, or as an embedded component of a card reader attached to the EGM. Once connected, the player's card number or other identification information is transferred over the protocol from the mobile device to the logic device within the EGM. The logic device within the EGM, in turn, makes the card number or identification information available to the internal processes within the cabinet allowing the card-in process to take place normally (i.e., performing the same functionality as if a card were physically inserted into the card reader of the EGM).

Current table games also support card in functionality, although this is typically accomplished by a player physically handing their player card to a casino employee, who then cards them in at a local workstation or tablet device, as will be further discussed. To streamline this process, reduce or eliminate the need for a physical card, and provide a more consistent experience for players across EGMs and table games, the mechanisms disclosed herein detail embodiments to manage player sessions at gaming tables within gaming establishments. These mechanisms include performing such functionality as receiving, by a table management system, identifying information of a player seated at the gaming table transmitted by the mobile device associated with the player; where the identifying information includes a seating position of the player at the gaming table, and where the seating position is determined by the mobile device through interaction with a locating device placed at the seating position at the gaming table. The table management system then generates the player session for the player for playing a wagering game at the gaming table using the identifying information of the player transmitted by the mobile device. Additional aspects and their attendant benefits will be further discussed, following.

Gaming Systems in a Gaming Environment

By way of background, but not by way of limitation, the following describes a representative computer environment in which the techniques of this disclosure (described below) may be practiced.

Turning now to FIG. 1, a block diagram illustrating a gaming system environment 100 is shown. Environment 100 includes a Gaming Terminal Data Repository (GTDR) connected via one or more network interface(s) to a gaming network which, for example, may include gaming devices (e.g., gaming terminals) and/or other devices, in which aspects of the present disclosure may be realized. As illustrated in FIG. 1, the gaming environment 100 may comprise a gaming system/environment 122 located in a physical environment (not shown). It will be appreciated that the communication links between the various components may be separate and distinct or may be commonly used. It will also be appreciated that one or more of the functions or applications described above may be consolidated, such as at a common server or host. Further, other components for implementing other functionality may be provided. For example, a variety of computing devices, such as user stations, may be connected to the various systems. Printers and other peripheral devices may also be connected to each network or system. A gaming system/environment 122 (e.g., the gaming establishment) may be located at least partially in one or more physical gaming environments, such as a casino, restaurant, and/or convenience store. For example, the casino may include publicly accessible game areas where certain of the gaming system devices 124, such as gaming machines 125 and table games 127 are located, as well as secure areas where the servers and other components are located.

In one embodiment, the physical environment includes at least a portion of a physical structure, such as the gaming establishment or casino, housing one or more components of the gaming system/environment 122. The gaming system/environment 122 includes one or more gaming system devices 124 or components. The gaming system devices 124 may include gaming machines 125, such as those known as video or slot machines. The gaming system devices 124 may also include "table" games 127 such as Blackjack and Roulette. The gaming system devices 124 may also include components or devices such as player tracking card readers 129, coin counters and other gaming device functionality options, and these devices or components may be linked or associated with other devices. The devices or components may also comprise computers or servers and communication equipment, cashier and accounting workstations, and a wide variety of other elements.

In one embodiment, the gaming system/environment 122 may include a variety of sub-systems. These sub-systems may be partially or fully independent of one another or may be related. In one embodiment, each system may be included or be part of a network. In one embodiment, the gaming system/environment 122 may include a game presentation/operation system, which includes at least one game server 126. The game server 126 may comprise a computing device including a processor and a memory. The game server 126 may be adapted to perform a variety of functions. This functionality may be implemented by software and/or hardware of the game server 126. In one embodiment, the game server 126 may be arranged to provide information or instructions to the one or more gaming devices 124 or individual gaming system components. The information may comprise game code and control data. In one embodiment, the game server 126 may also be arranged to accept information from the gaming devices 124 or components. For example, the game server 126 may accept information regarding the status of operation of a particular gaming system device 124 (such as "normal" or "malfunction").

In one embodiment, the game server 126 is part of a network, which includes a communication link between the game server 126 and selected gaming system device(s) 124 and/or other component(s) with which communication is desired. A communication interface may be associated with the game server 126 and each device or component for facilitating the communication. The communication interfaces may have a variety of architectures and utilize a variety of protocols such as IEEE-1394 (FireWire™) or Ethernet in the case where the communication link is a wired link, or a wireless link utilizing a wireless protocol such as WIFI, Bluetooth™, Radio Frequency (RF), Infrared, third generation partnership project (3GPP) long term evolution (LTE), Worldwide interoperability for Microwave Access (WiMAX), High Speed Packet Access (HSPA), etc. The communication links may transmit electrical, electromagnetic or optical signals, which carry digital data streams, or analog signals representing various types of information. In one embodiment, such as when the gaming system device 124 comprises a gaming machine 125, the gaming system device 124 may include a master gaming controller, which controls the functions of game operation. The communication interface may be associated with the master gaming controller, permitting data to be transmitted between the game server 126 and the master gaming controller.

In one embodiment, the gaming system/environment 122 may include a player tracking system, which includes at least one player-tracking server 128. The player-tracking server 128 may also comprise a computing device including a processor and a memory. The player-tracking server 128 may be adapted to perform player-tracking functions. For example, the player-tracking server 128 may store information regarding the identities of players and information regarding the game play of those players. This information may include time of play, coin in/coin out or other monetary transaction data, and in an arrangement where players are awarded points based on play, a player's point total. Once again, the player tracking system includes a network comprising a communication link provided between the player-tracking server 128 and one or more of the gaming system devices 124 having a player-tracking function or other components of the gaming system/environment 122 associated with the system. In one embodiment, such as where the gaming system device 124 comprises a gaming machine, the device may include a management interface board, which controls a card reader. The management interface board may be arranged to receive data from the master gaming controller of the gaming system device 124. A communication interface is associated with the management interface board, permitting data to be transmitted between the player-tracking server 128 and the management interface board.

In the case of table games, a card reader 129 may be associated with the table (e.g., the card reader located on or near the table game). Players may utilize the card reader 129 to identify themselves. Information regarding play of the table game may be input through an input device by a dealer, coin counter or the like, and this information may be transmitted to the player-tracking server 128.

In one embodiment, the gaming system/environment 122 may include an accounting system, which includes at least one accounting server 130. The accounting server 130 may comprise a computing device including a processor and a memory. The accounting server 130 is preferably adapted to perform financial related functions, such as track financial transactions such as bets and payouts, and perform reconciliations with monies collected from the gaming system devices 124, such as gaming machines 125 and table games 127. The accounting server 130 may be associated with a wide variety of devices, including individual gaming system devices 124, mobile devices 131, and other servers. Once again, a communication link may be provided between the accounting server 130 and each device with which communication is desired.

In one embodiment, the gaming system/environment 122 may include a progressive award system, which includes at least one progressive server 132. The progressive server 132 may comprise a computing device including a processor and a memory. The progressive server 132 may be designed to generate progressive award information. In one arrangement, the progressive server 132 may obtain information regarding amounts bet at specific gaming system devices 124, such as gaming machines 125 or table games 127. Utilizing this information, a progressive jackpot award amount may be generated and updated using a specified protocol. The information may be transmitted to one or more displays 134 associated with participating gaming system devices 124. Once again, a communication link is preferably provided between the progressive server 132 and each device with which communication is desired. For example, a link may be provided between the progressive server 132 and accounting server 130 for providing payout information to the accounting server 130. The accounting server 130 also reads the paid amounts from the electronic gaming machines 125 as well and makes sure the paid amounts match what the progressive server claimed the paid amounts should have been. If the paid amounts do not match, then the accounting server 130 may raise a flag for further investigation by casino staff or regulators.

A physical and/or virtual information host 136 is associated with or comprises a portion of the gaming system/environment 122. In one embodiment, the host 136 comprises a computing device, which includes a processor, memory and a display. The virtual information host 136 may be one or more devices separate from devices performing other functions of the system/environment 122, or may be integrated with existing devices. The virtual information host 136 may be designed and adapted to perform functions relating to acquiring, managing, rendering, generating and/or displaying real-time and/or non real-time casino gaming system or "gaming environment" graphical information and information regarding one or more components of the gaming system or environment. Such functionality may also include the generation of at least one graphical user interface on at least one mobile device (e.g., mobile device 131), which is configured or designed to graphically display information (e.g., real-time casino information) relating to selected aspects of casino activity. Also, different graphical user interfaces may be displayed on an external application (e.g., the gaming host application and/or selected mobile gaming application) of a computer, smartphone, and/or on any type of mobile device 131. In one embodiment, bi-directional communication channels 121 are provided for direct, two-way communication between the host 136 and at least one game server 126 and at least one player-tracking server 128, and/or any other device with which communication is desired.

As illustrated in the example of FIG. 1, gaming system/environment 122 may also include one or more of the mobile devices 131 configured or designed to communicate, via one or more wireless links 111, with various components of the gaming environment 100 such as, for example: information systems (e.g., virtual information host 136); player tracking systems; accounting systems; employee management systems; location positioning systems (e.g., GPS system 133); game servers; surveillance systems; security systems; communication systems; gaming systems (e.g., gaming machines 125, devices associated with table games 127, other mobile devices 131, etc.), etc.

It should be noted that, during an actual implementation of the functionality disclosed herein, players may use the mobile devices 131 to initiate funding transfers, and the mobile devices 131 may use a variety of communication protocols such as the aforementioned NFC, Bluetooth, and/ or other wireless communications to transfer funds to and from the EGM. The funds of the player may come from any type of financial institution (e.g., a bank) or a player wagering account of one or more gaming venues, and the funds of the player may also be stored on the mobile devices 131 as a virtual ticket. In one embodiment, the wireless communication may communicate directly with the processing unit on a particular and identified EGM or device associated with table games 127. The EGM or device associated with table games 127 may further be configured with a software and/or hardware device that communicates with the mobile devices 131. The EGM or device associated with table games 127 may contain a device that communicates with the payment acceptor (e.g., a bill acceptor or printer) to simulate bills and tickets. The EGM or table game 127 may have a device (software and/or hardware) that communicates with a back-end host that ultimately uses slot account system (SAS) or game-to-system (G2S) to move the money to and from the particular and identified EGM or device associated with table games 127.

The various gaming devices, the central controller and the display segments may include serial interfaces and/or Ethernet (e.g., the G2S protocol uses commodity Ethernet equipment and TCP/IP) to connect to specific subsystems or subnets internal and external to the player stations, central controller and the display segments. The serial devices may have electrical interface requirements that differ from the "standard" EIA serial interfaces provided by general-purpose computers. These interfaces may include EIA, EIA, Fiber Optic Serial, optically coupled serial interfaces, current loop style serial interfaces, etc. In addition, to conserve serial interfaces internally in the gaming devices, serial devices may be connected in a shared, daisy-chain fashion where multiple peripheral devices are connected to a single serial channel.

The serial interfaces and/or Ethernet may be used to transmit information using communication protocols that are unique to the gaming industry. For example, SAS is a communication protocol used to transmit information, such as metering information, from a player station to a remote device. Often SAS is used in conjunction with the aforementioned player tracking system. EGMs or devices associated with table games 127 may be treated as peripheral devices to a casino communication controller and connected in a shared daisy-chain fashion to a single serial interface and/or Ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup.

Card-less Login at Table Games

Figure 2:
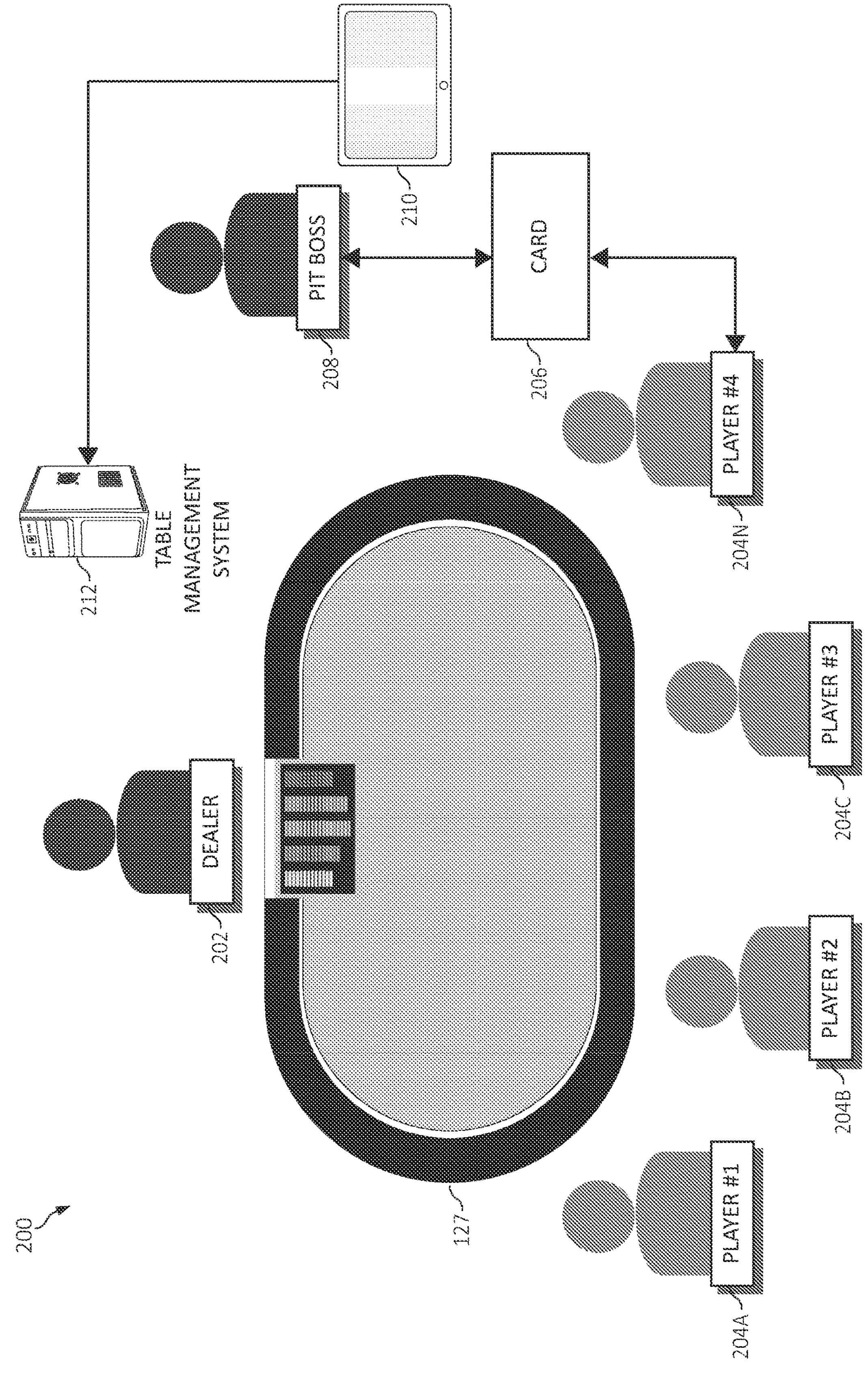
FIG. 2 is a block diagram illustrating an existing process for generating a player session at a gaming table.

Having described one or more gaming establishments and/or EGMs and additional gaming device architectures, turning now to FIG. 2, a block diagram 200 depicting an existing process for generating a player session at a gaming table is illustrated. Shown in diagram 200 is a table game 127 staffed by a gaming establishment employee (i.e., dealer 202), and being played by players numbered 1-4 (referenced in diagram 200 as players 204A, 204B, 204C and 204*n*, or collectively referred to as players 204A-*n*). As is depicted in diagram 200, players 204A-*n* are seated at various locations around the table game 127 such that the players 204A-*n* are positioned to interact with one another and the dealer 202 to facilitate playing the table game 127.

As previously discussed, table games in general, such as table game 127, may have existing processes in place to card-in players 204A-*n* to thereby establish a player session for the respective player commensurate with placing a wager to play the table game 127 and/or receive potential winnings associated with the game play. In the depicted embodiment, one or more of the players 204A-*n* must hand their physical player card 206 to a gaming establishment employee (which may be the dealer 202 or a "pit boss" 208 overseeing the game play at the table game 127), who in turn may insert, swipe, tap, or otherwise connect the physical player card 206 to a local workstation (e.g., a tablet device 210). The tablet device 210 may then communicate with a back-end table management system server 212 to generate the account login and create (and subsequently end) the player session. As mentioned in FIG. 1, the table management system server 212 may communicate with the tablet device 210 using Wi-Fi, Ethernet, Bluetooth®, etc. In some embodiments, the table management system server 212 and the tablet device 210 may be connected through an Intranet local to the gaming establishment. Further, the table management system server 212 comprises many of the components identified in FIG. 1, such as at least one microprocessor and memory device holding executable instructions. In some embodiments, the table management system server 212 may be comprised of and operate analogous or otherwise substantially similar to the game server 126 discussed in FIG. 1.

While this described implementation of carding-in via a physical card handed to the gaming establishment employee does indeed accomplish the task of generating the player session, this implementation requires the player to hold a physical card on their person as they play one game to the next within the gaming establishment, even as many of the other games do not require the physical card but rather generate the player session using a virtual card presented to the EGM or other gaming device through the player's mobile device, as described previously. This scenario creates an inconsistent experience for the player within the gaming establishment and, worse, may lead to unnecessary inconveniences should the player misplace their physical player card. Moreover, requiring the player to be "manually" carded-in by a gaming establishment employee to generate their player session requires the gaming establishment employee time and effort which may otherwise be spent on facilitating game play (as other players may be waiting on a first player to be carded-in). Or, in another example, some table games 127 have a fairly high turnover rate at which players commence and end their respective gameplay, which can become burdensome for the gaming establishment employee to handle if many patrons are constantly arriving or leaving a particular game during a given time period.

Figure 3:
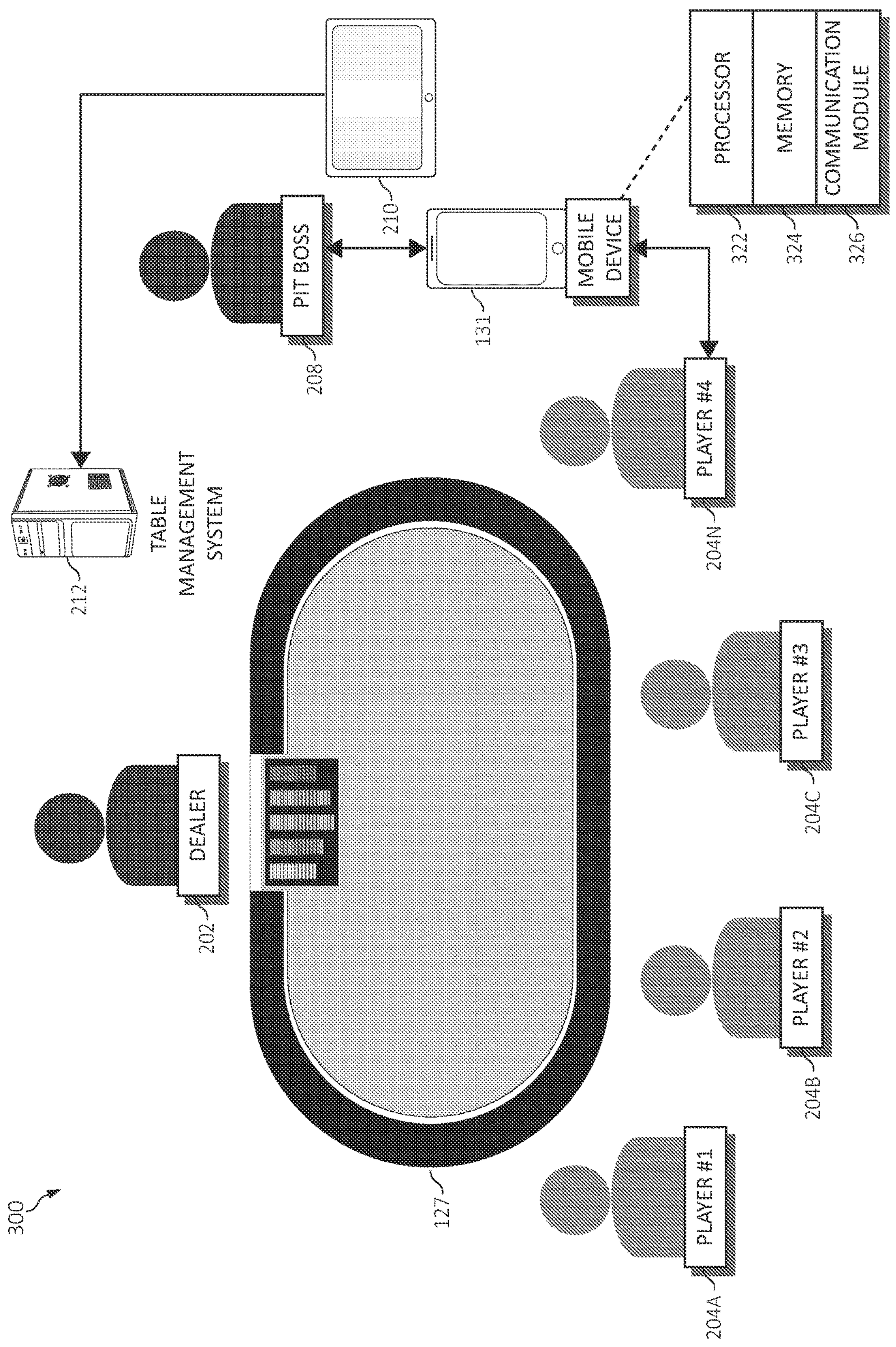
FIG. 3 is a block diagram illustrating a process for generating a player session at a gaming table, according to aspects of the present disclosure.

Given the aforementioned, the mechanisms presented herein consider advances to the processes for carding-in, logging in, or otherwise generating player sessions for players without the need for a physical player card. Rather, utilizing the functionality disclosed herein, players may use their mobile device to generate this player session where the mobile device includes a particular gaming establishment application which serves to identify the player and track wagers, winnings, other financial transactions, and/or other data of the player. Several embodiments are considered with a first embodiment presented as block diagram 300 of FIG. 3.

For table games such as table game 127, one way to achieve card-less login via the respective player 204A-*n*'s mobile device 131 is to attach or otherwise connect a card-less antenna to the aforementioned gaming establishment employee's workstation or tablet device 210. To card-in a player, the player 204A-*n* may, for example, hand his or her mobile device 131 to the gaming establishment employee. Again, the gaming establishment employee may be the dealer 202 at the table game 127, or it may be another employee (i.e., pit boss 208) who is roaming the various tables in the pit to support players' needs, such as helping them begin or cease a player session. The gaming establishment employee may have to take the player 204A-*n*'s mobile device 131 back to a fixed workstation to start their session (e.g., by tapping, swiping, or merely bringing the mobile device 131 near the antenna affixed to the workstation), or they themselves may have a mobile computing device, such as the tablet device 210, which allows them to scan/bring near the player 204A-*n*'s mobile device 131 at the table the player 204A-*n* is seated at (i.e., table game 127).

In some embodiments, the mobile device 131 may include at least one processor 322, such as a microprocessor, a microcontroller-based platform, a suitable integrated circuit or one or more ASICs. The processor 322 is in communication with or operable to access or to exchange signals with at least one data storage or memory device 324. The memory device 324 stores program code and instructions, executable by the processor 322, to control the mobile device 131. The memory device 324 also stores other data such as application data or player identification and financial information that relate to the play of the table game 127. In one embodiment, the memory device 324 includes random access memory (RAM), which can include non-volatile RAM (NVRAM), magnetic RAM (MRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Further, the mobile device may include a communications module 326 allowing the mobile device 131 to transfer data to and from logic devices, antennae, and backend server equipment as discussed herein using any of the wireless/wired protocols previously mentioned.

Figure 4A:
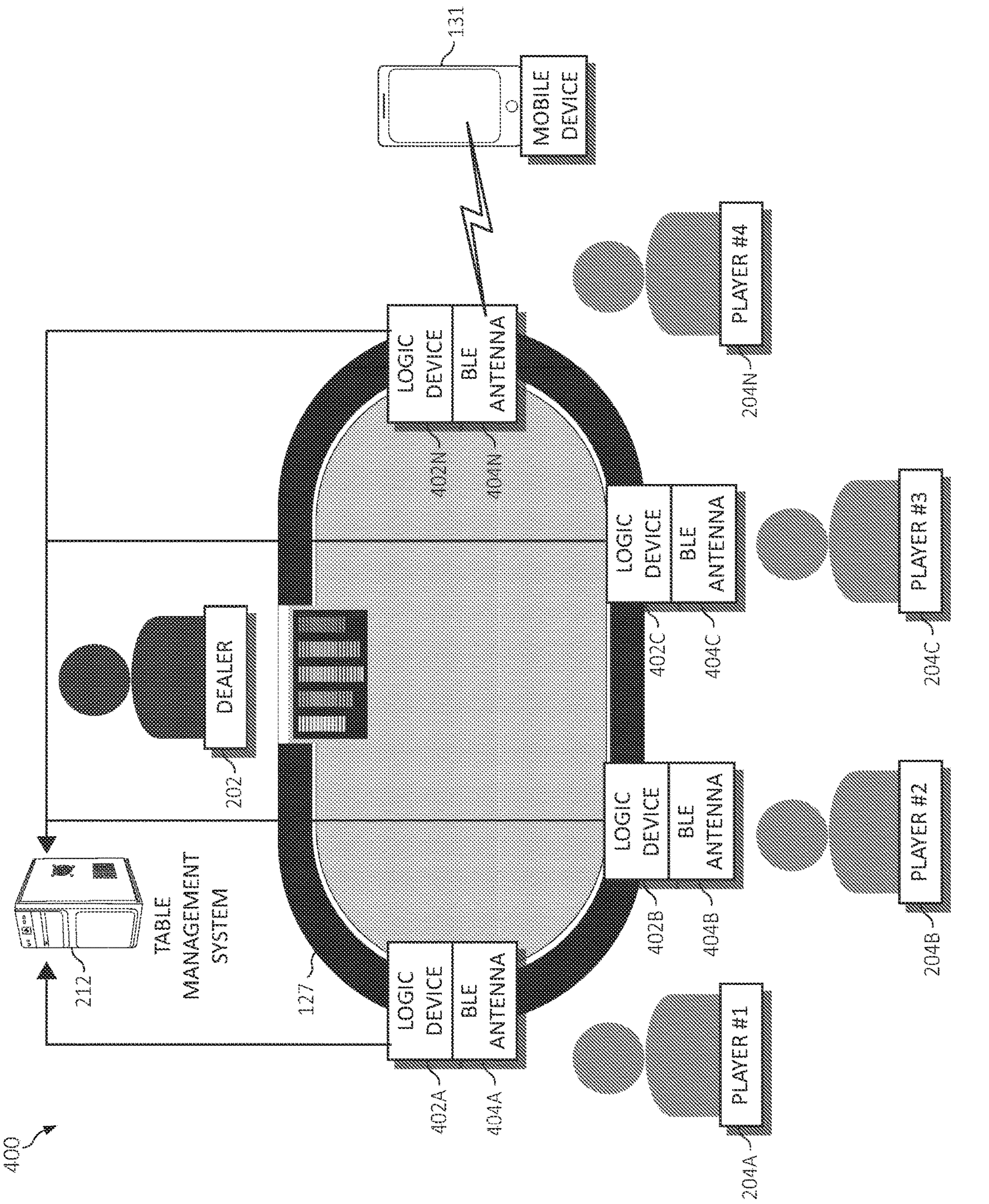
FIG. 4A is a block diagram illustrating an additional process for generating the player session at the gaming table, according to aspects of the present disclosure.

While the processes depicted in diagram 300 ultimately removes the need requiring the player 204A-*n* to carry a physical player card, this continues to lead to an other-than-ideal player experience, and still requires manual intervention on the part of the operator. For example, the gaming establishment employee (e.g., pit boss 208) still needs to record which table game 127 the player 204A-*n* is seated at, and which seat location the player 204A-*n* is occupying at that table game 127. A more preferable embodiment includes placing a device (e.g., logic device 402A-*n*) and an antenna (e.g., Bluetooth® or NFC antenna 404A-*n*) at every player seating position at the table game 127, as depicted in diagram 400 of FIG. 4A. The embedded logic device 402A-*n* implements all of the application-level messaging that must be exchanged between the player 204A-*n*'s mobile device 131 and the table management system server 212, while the antenna 404A-*n* would connect each respective logic device 402A-*n* to the player's mobile device 131. This implementation would provide an elegant solution to the problem being addressed, however, may be cost-prohibitive (especially when considering retrofitting an existing table game 127) as each seat at each table game 127 would require its own logic device 402A-*n* and antenna 404A-*n*.

Figure 4B:
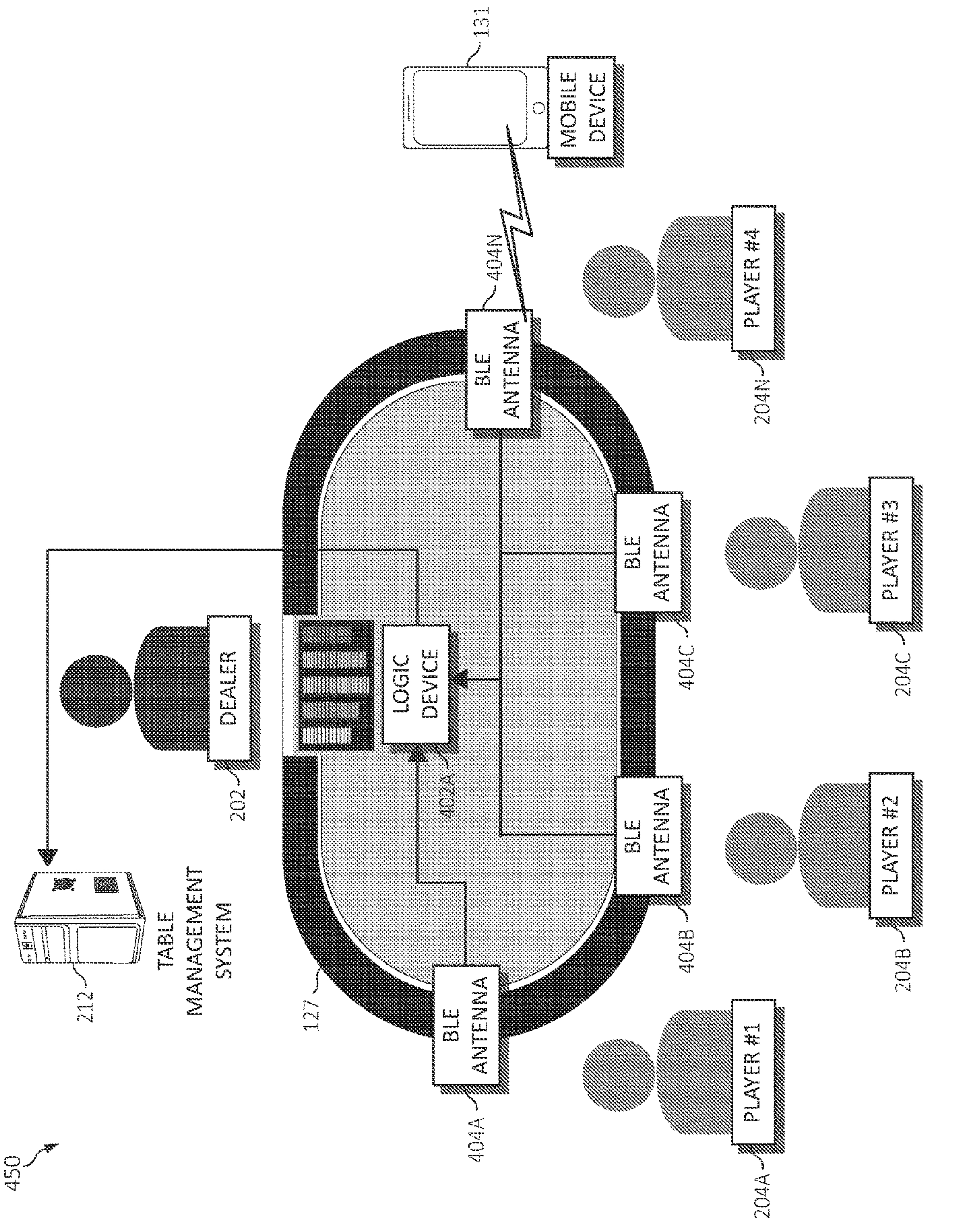
FIG. 4B is a block diagram illustrating an additional process for generating the player session at the gaming table, according to aspects of the present disclosure.

Thus, alternatively and as shown in diagram 450 of FIG. 4B, another solution is to provide one logic device 402A that is coupled to and controls multiple antennas 404A-*n* (one per player seating position) and controls wireless communications with each player 204A-*n*'s mobile device 131 at each seat through the respective antenna 404A-*n*. In this embodiment, the logic device 402A is configured such that it "knows" which player seat (which seating position) each antenna 404A-*n* is physically wired to. This may be accomplished by identifying a certain port on the logic device 402A of which each antenna 404A-*n* is connected to, using a unique identifier for each seating position where the unique identifier is transmitted with data from the mobile device 131 to the logic device 402A through each respective antenna 404A-*n*, or any other commonly used technique known in the art. By using one logic device 404A coupled to the plurality of antennas 404A-*n*, this would provide the same player experience as having a logic device 402A-*n* and antenna 404A-*n* at each seating position (or "station") while saving costs by not requiring a logic device 402A-*n* at each player station like the example in diagram 400.

Again, in the implementation depicted in diagram 450, the logic device 402A may have multiple USB or other communication ports for controlling and communicating with each antenna 404A-*n*. The antennas 404A-*n* would respectively be attached to each player station and the wires from each antenna 404A-*n* may be routed back the logic device 402A, preferably either embedded within the table or in a discrete location so as to prevent unsightly components showing to the players 204A-*n* while also preventing tampering. The logic device 402A has configuration information allowing it to know at which player station each antenna 404A-*n* is located (either by determining which communication port the antenna 404A-*n* is transmitting to or by a unique identifier associated with the seating position, etc.) Upon reading the "virtual" card information generated by the mobile device 131 from the antenna 404A-*n*, the logic device 402A communicates over a network to a back-end table management system server 212, and presents information about the table game 127 the respective player 204A-*n* is located at and the respective seating position that the player 204A-*n* is starting a session for. The logic device 402A may, as aforementioned, be connected through a network to the back-end table management system server 212, where the network may comprise Ethernet, Wi-Fi, or leverage other commonly used commercial networking technologies as discussed previously in the description.

Still referring to diagram 450, in another embodiment, the logic device 402A may be used for multiple table games 127. That is, one centrally located logic device 402A may be used to control multiple antennas at multiple table games 127 within a certain predefined area within the gaming establishment. In this way, dependent on the specifications of the logic device 402A, multiple players other than players 204A-*n* shown may generate player sessions through multiple antennas other than antennas 404A-*n* at one or more additional table games 127.

Figure 5:
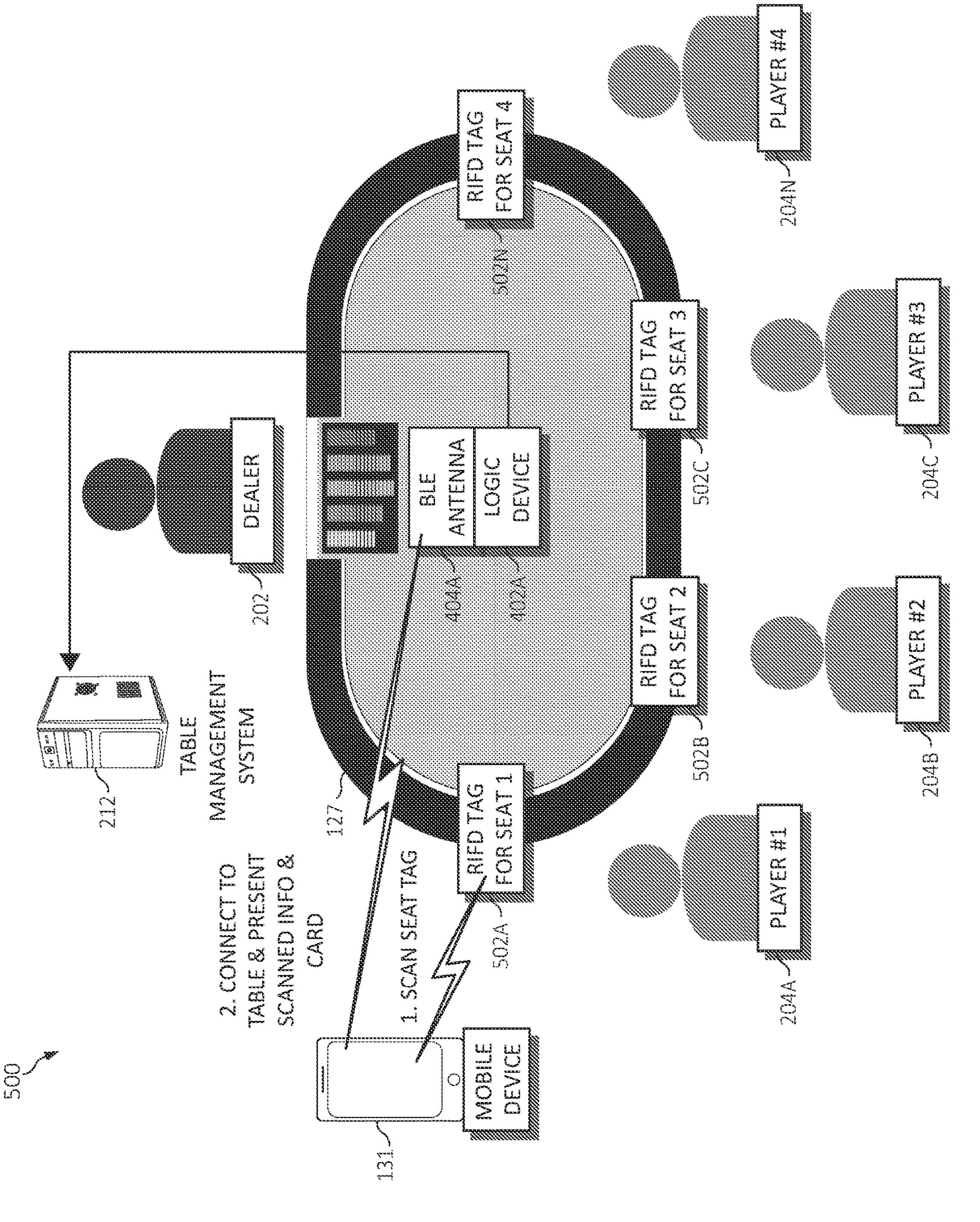
FIG. 5 is a block diagram illustrating an additional process for generating the player session at the gaming table, according to aspects of the present disclosure.

Numerous concerns exist with placing antennas 404A-*n* at each seat of the table game 127. For example, the cost and complexity of retrofitting a particular table to support the wiring and integration of the antennas may be high, or prove to significantly disrupt gaming establishment operations. One alternative approach, as depicted in diagram 500 of FIG. 5, is to place a Radio-frequency Identification (RFID) tag 502A-*n* or Bluetooth® iBeacon device at each seating location at the table game 127. In this implementation, the player 204A-*n* may tap, swipe, or otherwise bring near their mobile device 131 to the respective RFID tag 502A-*n* or iBeacon device at their seating location at the table game 127. Upon bringing the mobile device 131 close enough to “scan” the respective RFID tag 502A-*n* or iBeacon device, the mobile device 131 may then attempt to connect to the logic device 402A for the table (or nearest appropriate logic device 402A-*n*) through an antenna 404A associated with the logic device 402A, and once connected, present to the logic device 402A information that uniquely identifies the seat that the player 204A-*n* is seated at (based upon information provided by the RFID tag 502A-*n* or iBeacon device scanned by the player 204A-*n*'s mobile device 131).

A main benefit of this approach is that, generally speaking, RFID tags or iBeacons are of relatively low cost and can be purchased as small sticker-like devices that can be physically placed on the table game 127 right in front of each seating position of the respective player 204A-*n*. This helps reduce downtime and setup complexity, while also improving the player experience, while automating the mapping of a player 204A-*n* to a given table game 127 and seating position thereof. The gaming establishment application executing on the player 204A-*n*'s mobile device 131 may determine which logic device 402A-*n* to connect to based upon wireless signal strength to the nearest logic device 402A-*n*, or the gaming establishment application may determine which logic device 402A-*n* to connect to based upon some additional information read from the respective seat-level RFID tag 502A-*n* or iBeacon. Other embodiments are possible such as having a single logic device 402A support multiple table games 127 as previously described.

Figure 6:
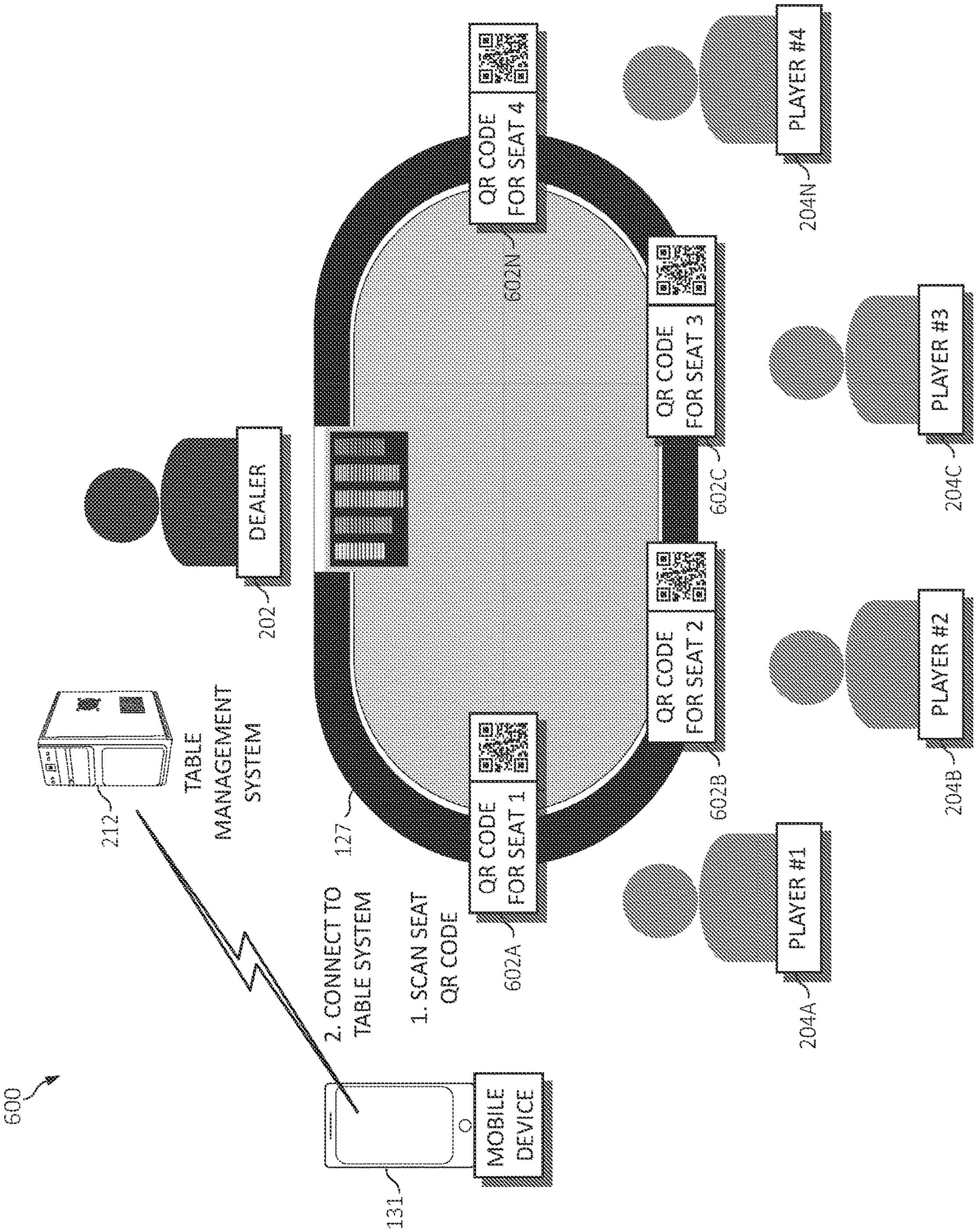
FIG. 6 is a block diagram illustrating an additional process for generating the player session at the gaming table, according to aspects of the present disclosure.

Additionally, instead of RFID tags 502A-*n* or iBeacons, QR codes 602A-*n* may be developed for each seat such that a unique QR code contains identifying information about the respective table game 127 and seating position thereof. In this implementation, depicted in diagram 600 of FIG. 6, the gaming establishment application executing on the player 204A-*n*'s mobile device 131 may initiate the player session subsequent to connecting a server (e.g., the table management system server 212) over a wireless connection and presenting information scanned regarding the player 204A-*n*, the table game 127 the player 204A-*n* is seated at, and the seating position at the table game 127 from the respective QR code 602A-*n*. Again, other embodiments are possible, such as having the mobile device 131 use QR code information from the respective QR codes 602A-*n* to bootstrap a Bluetooth® connection to a table-level logic device 402A or the table management system server 212.

A certain risk of many of the previously discussed approaches that leverage an RFID tag, iBeacon, QR code, or other passive listening or photo technology to identify a player's seat is that it may be relatively easy for an attacker to attempt to start a player session at a particular seat without having to actually be present at that seat. For example, an attacker may scan a respective RFID tag 502A-*n*, walk away from the table game 127, and yet later attempt to connect to the table-level logic device 402A-*n* when at a distance away from the table where the attacker is still able to do so. In view of this, various approaches to mitigate these attacks are further provided. In the case of utilizing iBeacons or RFID tags 502A-*n*, the data broadcast therefrom may change as a function of time, and the nearest logic device 402A-*n* may be synchronized with the respective iBeacon or RFID tags 502A-*n* to determine what data it should broadcast next. One possible implementation of this functionality could leverage a time-based one-time password algorithm, or similar mechanisms, which allow one or more entities to agree on a secret and unique data exchange that changes as a function of time.

Figure 7:
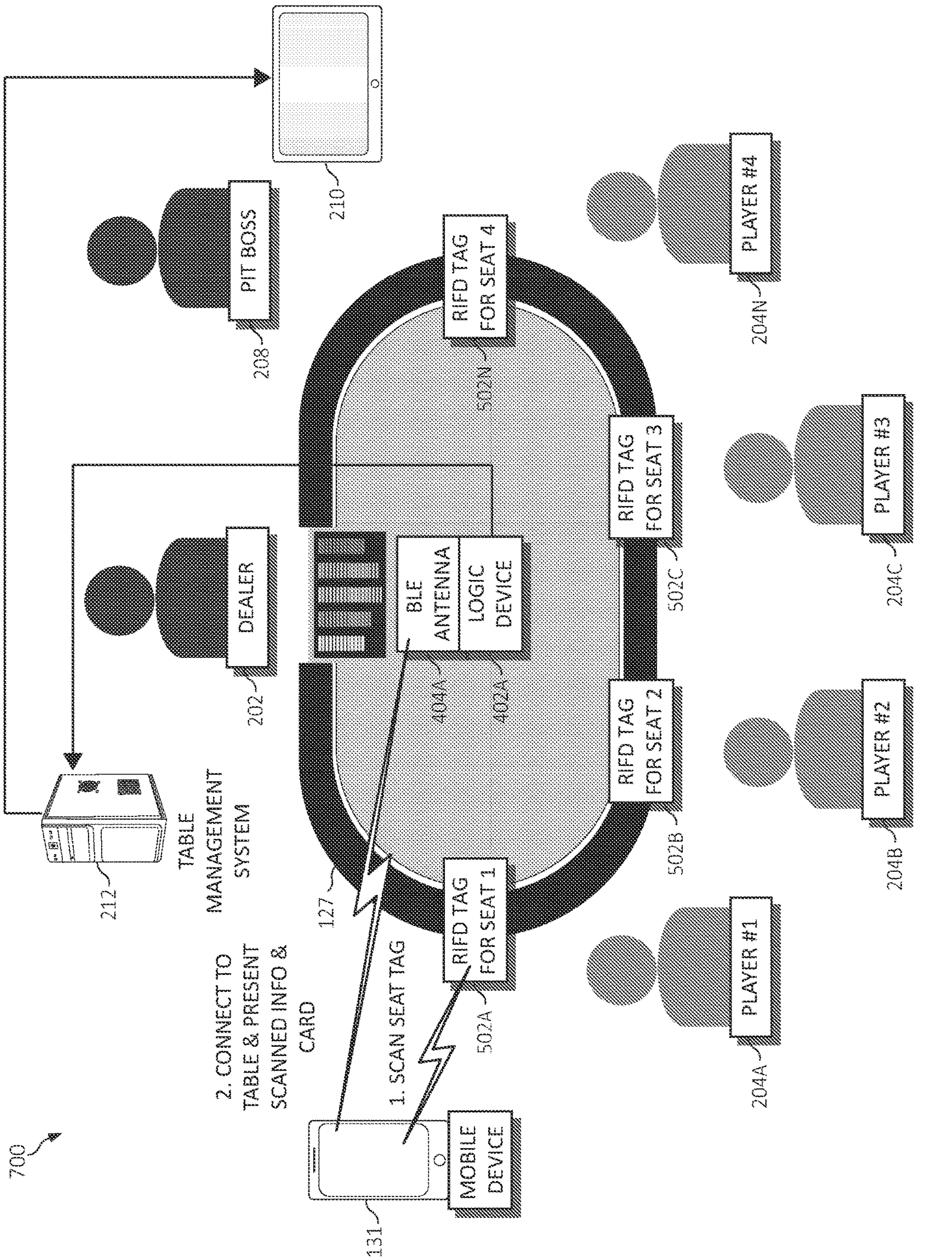
FIG. 7 is a block diagram illustrating still an additional process for generating the player session at the gaming table, according to aspects of the present disclosure.

Another possible approach to mitigate security risks is to require the operator (pit-level staff such as pit boss 208 or dealer 202) to manually approve each attempt by a player 204A-*n* to start a player session at a given seat of the respective table game 127. In one such implementation, depicted in diagram 700 of FIG. 7, a notification is displayed on the tablet device 210 or workstation used by the pit boss 208, who then must approve a player session start request. That is, upon the respective player 204A-*n* scanning a respective RFID tag 502A-*n*, for example, and subsequently connecting to the table-level logic device 402A at the table game 127 (which in turn communicates with the table management system server 212), the pit boss 208 (or other gaming establishment staff) may receive a notification on the tablet device 210 or workstation indicating that the respective player 204A-*n* desires to initiate a player session. In this way, the pit boss 208 may then validate that the respective player 204A-*n* is actually seated at the identified table seat before approving the session to begin.

Walk-away detection is another area where enhancements may be required in order to support models other than placing a respective antenna 404A-*n* per seat at the table game 127. In traditional walk-away detection at an EGM, the gaming establishment application executing on the mobile device 131 is pre-configured to disconnect from the logic device thereof once signal strength detected by the mobile device 131 is determined to be lower than a certain threshold. Additionally, the logic devices in EGMs are also typically configured with a minimum signal strength that will trigger a disconnect between the EGM and the mobile device 131 of the player. This model may be appropriate for table games 127, although other models may be more appropriate. In one alternative model, the gaming establishment application executing on the mobile device 131 may sample the signal strength of the connection to the respective logic device 402A-*n* of the table game 127 when the mobile device 131 initially establishes a connection thereto. That is, the mobile device 131 may determine what the signal strength is between the mobile device 131 and the respective antenna 404A-*n* of the table game 127 upon connection (as a “control” signal strength). Using this sampled signal strength, the mobile device 131 may then apply an algorithm to determine the appropriate walk-away disconnect threshold.

For example, a disconnect could be triggered if the signal strength drops by 40% relative to the initial signal strength sample(s) when the connection between the logic device 402A-*n* and the mobile device 131 through the respective antenna 404A-*n* was first established. Each logic device 402A-*n* may also apply a similar algorithm, where the respective logic device 402A-*n* will trigger a disconnect from the mobile device 131 if the signal strength decreases by a certain percentage or value (e.g., 40%) from the signal strength sampled (measured) during connection. In some embodiments, the control signal strength may be sampled during only the initial connection between the mobile device 131 and the logic device 402A-*n* (via the respective antenna 404A-*n*), or in other embodiments, the control signal strength may be continually measured after the initial connection for a certain time period, and this continually measured signal strength may be averaged to determine what the control signal strength should be. Other models are also possible, where the mobile device 131 may look up a walkaway detection threshold from the gaming establishment application and/or a management server (e.g., the table management system server 212) based upon the respective table game 127, antenna 404A-*n*, or logic device 402A-*n* that the mobile device 131 is connecting thereto.

Figure 8:
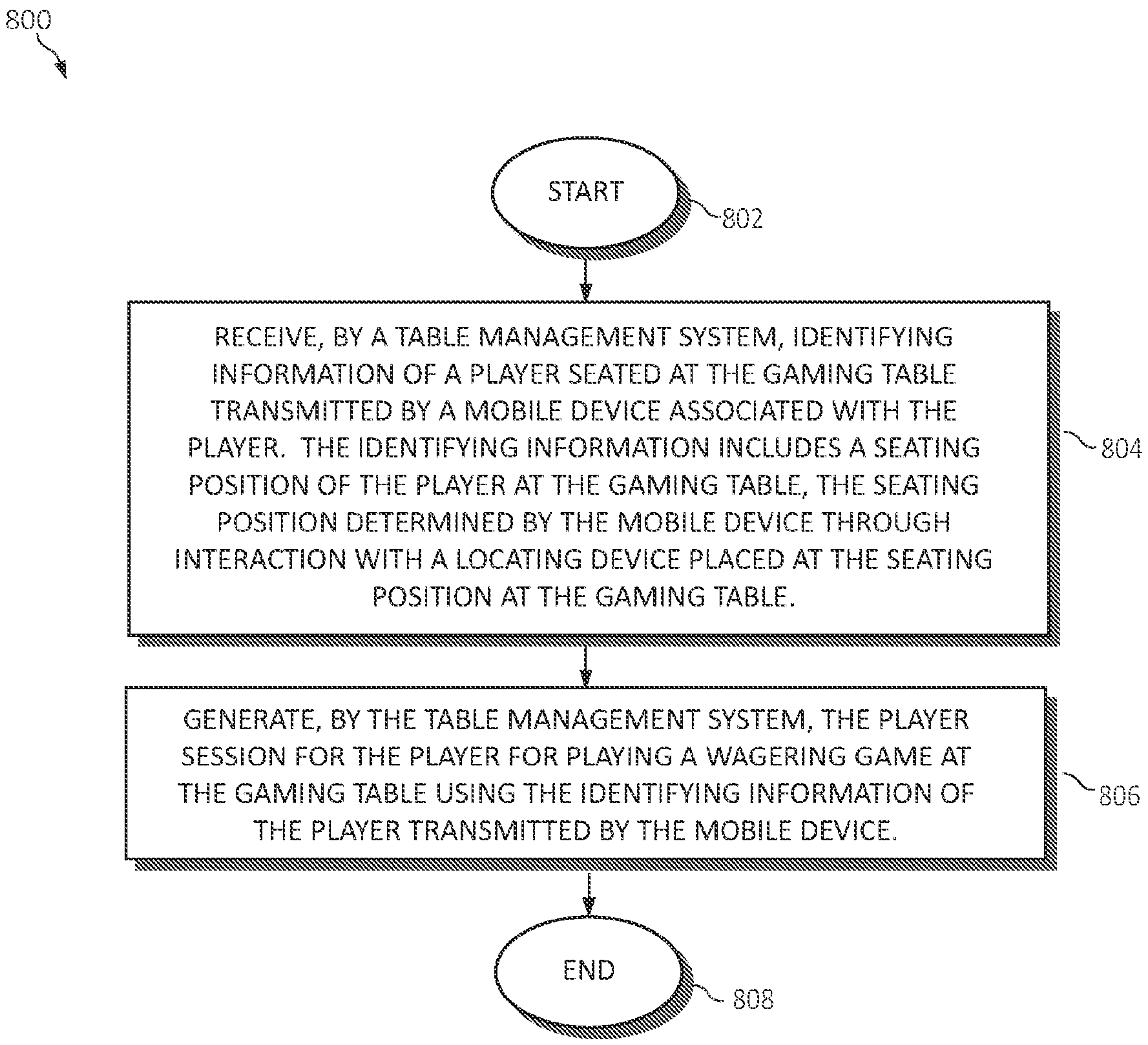
FIG. 8 is a flowchart illustrating an exemplary method for managing a player session at a gaming table in a gaming environment, according to aspects of the present disclosure.

Summarizing, FIG. 8 is a flowchart illustrating an exemplary method 800 for managing a player session at a gaming table. The method 800 may be performed by one or more microprocessors executing instructions stored in a memory device, and may be performed commensurate with any of the environments depicted in FIGS. 1-7. Beginning at step 802, a table management system receives identifying information of a player seated at the gaming table transmitted by a mobile device associated with the player. The identifying information includes a seating position of the player at the gaming table, the seating position determined by the mobile device through interaction with a locating device placed at the seating position at the gaming table (step 804). The table management system generates the player session for the player for playing a wagering game at the gaming table using the identifying information of the player transmitted by the mobile device (step 806). The method 800 ends (step 808).

In one aspect, in conjunction with and/or as part of at least one block of FIG. 8, the functionality of the method 800 may include one or more of the following.

In one aspect, the gaming table includes a plurality of the locating devices such that each of the plurality of locating devices is placed at each respective seating position at the gaming table; each locating device comprising an antenna communicating with the mobile device over a Bluetooth or Near Field Communication (NFC) protocol.

In one aspect, a logic device is implemented where the logic device is associated with the gaming table in communication with each of the plurality of locating devices. The logic device interacts with the mobile device associated with the player to exchange application-level messages between the mobile device and the table management system.

In one aspect, the plurality of locating devices each comprise a Radio-frequency identification (RFID) tag; and the player scans the RFID tag using the mobile device to register the seating position of the player within an application executing on the mobile device. Subsequent to the scanning, the logic device associated with the gaming table is connected to by the mobile device to initiate the generation of the player session with the identified information including the registered seating position of the player.

In one aspect, the mobile application executing on the mobile device determines the logic device to connect thereto as a nearest logic device to the mobile device, the nearest logic device to the mobile device identified by one of: having a highest wireless signal strength captured by the mobile device when compared to a signal strength produced by a plurality of the logic devices; and information encoded in the RFID tag as captured by the mobile application of the mobile device.

In one aspect, the plurality of locating devices each comprise a Quick Response (QR) code; and the player scans the QR code using the mobile device to register the seating position of the player within the application executing on the mobile device; and subsequent to the scanning, connects directly to the table management system, by the mobile device, to initiate the generation of the player session with the identifying information including the registered seating position of the player.

In one aspect, for ensuring the player is seated at the seating position during gameplay at the gaming table, a time-based data synchronization algorithm is used for data broadcasted between the mobile device and the logic device such that the data exchanged between the mobile device and the logic device changes as a function of time; and/or an operator of the gaming table is required to approve an approval request presented on an external device upon receiving the identifying information and prior to generating the player session.

In one aspect, a determination is made that the player has left the gaming table, and upon determining the player has left, the logic device is disconnected from by the mobile device, and the player session is closed by detecting, by one of the logic device and the mobile device, that the wireless signal strength between the logic device and the mobile device has fallen below a first predetermined threshold; and/or sampling, by the mobile device, the wireless signal strength between the mobile device and the logic device upon first connecting to the logic device; wherein a disconnect algorithm is applied such that the disconnecting from the logic device is performed once the wireless signal strength falls below a second predetermined threshold relative to an initial signal strength detected upon first connecting.

As will be appreciated by one skilled in the art, aspects of the present disclosure may be embodied as an apparatus, system, method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure have been described above with reference to flowchart illustrations and/or block diagrams of methods, apparatus, and systems according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowcharts and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

The flowcharts and block diagrams in the above figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method, comprising:
establishing a wireless connection between a mobile device associated with a player and a logic device having a predetermined position in a casino;
determining, at the mobile device, identifying information of the player;
providing the identifying information of the player from the mobile device to a management system administered by a gaming operator, wherein the identifying information of the player includes a position of the player within the casino, wherein the management system is in communication with a plurality of logic devices, and wherein each of the plurality of logic devices is placed at different predetermined positions within the casino;
causing the mobile device to exchange data comprising application-level messages with the management system during a player session;
monitoring the position of the mobile device to ensure that the mobile device remains within a predetermined range of the logic device as part of maintaining the player session; and
employing a time-based data synchronization algorithm for the data exchanged between the mobile device and the management system such that the data exchanged between the mobile device and the management system during the player session changes as a function of time.

2. The method of claim 1, wherein the logic device is associated with an electronic gaming machine (EGM) and is included in a cabinet of the EGM.

3. The method of claim 1, wherein the logic device is associated with a table game and is positioned at a location of a table at which the table game is played.

4. The method of claim 3, wherein the identifying information comprises a seating position of the player at the table.

5. The method of claim 1, wherein each logic device in the plurality of logic devices comprises an antenna capable of communicating with the mobile device over a Bluetooth protocol.

6. The method of claim 1, wherein each logic device in the plurality of logic devices comprises an antenna capable of communicating with the mobile device over a Near Field Communication (NFC) protocol.

7. The method of claim 1, wherein the position of the player within the casino is determined, at least in part, based on the predetermined position of the logic device.

8. The method of claim 1, wherein the position of the player within the casino is determined, at least in part, based on a position of a device that is scanned by the mobile device.

9. The method of claim 1, further comprising:
requiring a casino operator to approve an approval request presented on an external device upon receiving the identifying information and prior to establishing the player session.

10. The method of claim 1, further comprising:
detecting that a wireless signal strength between the logic device and the mobile device has fallen below a predetermined threshold; and
in response to detecting that the wireless signal strength between the logic device and the mobile device has fallen below the predetermined threshold, discontinuing the player session.

11. The method of claim 1, further comprising:
sampling, by the mobile device, a wireless signal strength between the mobile device and the logic device upon establishing the wireless connection; and
implementing a disconnect algorithm such that the player session is discontinued once the wireless signal strength falls below a predetermined threshold relative to an initial strength detected upon establishing the wireless connection.

12. The method of claim 1, further comprising:
storing, on the mobile device, a virtual ticket representing funds available to the player for wagering; and
transferring, via the wireless connection, information describing the virtual ticket to enable the player to wager the funds during the player session.

13. A mobile device, comprising:
an antenna;
a processor coupled with the antenna; and
a memory device coupled with the processor, wherein the memory device comprises instructions stored thereon that, when processed by the processor, enables the processor to:
establish, via the antenna, a wireless connection with a logic device having a predetermined position in a casino;
determine identifying information of a player associated with the mobile device;
provide the identifying information of the player to a management system administered by a gaming operator, wherein the identifying information of the player includes a position of the mobile device within the casino, wherein the management system is in communication with a plurality of logic devices, and wherein each of the plurality of logic devices is placed at different predetermined positions within the casino;

exchange data comprising application-level messages with the management system during a player session;

monitor the position of the mobile device to ensure that the mobile device remains within a predetermined range of the logic device as part of maintaining the player session; and employ a time-based data synchronization algorithm for the data exchanged with the management system such that the data exchanged with the management system during the player session changes as a function of time.

14. The mobile device of claim 13, wherein the logic device is associated with an electronic gaming machine (EGM) and is included in a cabinet of the EGM.

15. The mobile device of claim 13, wherein the logic device is associated with a table game and is positioned at a location of a table at which the table game is played.

16. The mobile device of claim 15, wherein the identifying information comprises a seating position of the player at the table.

17. The mobile device of claim 13, wherein the position of the player within the casino is determined, at least in part, based on the predetermined position of the logic device.

18. The mobile device of claim 13, wherein the instructions further enable the processor to:

detect that a wireless signal strength between the logic device and the mobile device has fallen below a predetermined threshold; and in response to detecting that the wireless signal strength between the logic device and the mobile device has fallen below the predetermined threshold, discontinue the player session.

19. The mobile device of claim 13, wherein the instructions further enable the processor to:

sample a wireless signal strength between the mobile device and the logic device upon establishing the wireless connection; and implement a disconnect algorithm such that the player session is discontinued once the wireless signal strength falls below a predetermined threshold relative to an initial strength detected upon establishing the wireless connection.

20. A system, comprising:

a processor; and a memory device coupled with the processor, wherein the memory device comprises instructions stored thereon that, when processed by the processor, enables the processor to:

establish a wireless connection between a mobile device and a logic device having a predetermined position in a casino;

determine identifying information of a player associated with the mobile device;

provide the identifying information of the player to a management system administered by a gaming operator, wherein the identifying information of the player includes a position of the mobile device within the casino, wherein the management system is in communication with a plurality of logic devices, and wherein each of the plurality of logic devices is placed at different predetermined positions within the casino;

exchange data comprising application-level messages with the management system during a player session;

monitor the position of the mobile device to ensure that the mobile device remains within a predetermined range of the logic device as part of maintaining the player session; and employ a time-based data synchronization algorithm for the data exchanged with the management system such that the data exchanged with the management system during the player session changes as a function of time.

* * * * *